3,365,412
POLYURETHANE FIBERS AND FOILS
Wilhelm Thoma, Cologne-Flittard, and Harald Oertel, Wolfgang Heydkamp, Heinrich Rinke, and Erwin Müller, Leverkusen, Germany, assignors to Farbenfabriken Bayer Aktiengesellschaft, Leverkusen, Germany, a German corporation
No Drawing. Filed Sept. 8, 1964, Ser. No. 395,056
Claims priority, application Germany, Sept. 7, 1963, F 40,705
8 Claims. (Cl. 260—32.6)

This invention relates to highly elastic polyurethane foils and fibers.

It is known to produce highly elastic foils and fibers by the isocyanate polyaddition process by reacting substantially linear polyhydroxyl compounds of relatively high molecular weight, for example, polyesters and polyethers with polyisocyanates. The resulting prepolymer containing NCO groups is further reacted in solution with chain extenders. The elastomer present in solution is then, with removal of the solvent and with shaping, spun, for example, by wet or dry spinning processes to form filaments, cast to form foils or applied to supports such as textiles.

However, favorable for the major part the mechanical and elastic properties of such elastomers, they nevertheless have a series of disturbing defects, depending upon the polyhydroxyl compounds chosen for their production.

Fibers and foils having a structure based on polyesters, polyester amides and polyacetals are relatively susceptible to hydrolysis, an alkaline medium being particularly harmful to polyesters and polyester amides and an acid medium having the same effect on polyacetals. Polyethers and polythioethers form fibers and foils which are resistant to hydrolysis but on account of the accumulated ether groups, these fibers and foils have a considerable susceptibility to oxidation, which is further increased under the influence of light. The strength of fibers and foils produced on this basis decreases considerably with exposure to light, a brown coloring being formed.

It is, therefore, an object of this invention to provide fibers and foils which have improved strength and color even on prolonged exposure to light. Another object of this invention is to provide fibers and foils which are resistant to hydrolysis and oxidation even under the influence of light. Still another object of this invention is to provide fibers and foils prepared in solution by wet or dry spinning techniques which have improved physical properties. Another object of this invention is to provide polyurethane plastics and a method of shaping the same into fibers and films which have improved physical properties.

The foregoing objects and others which will become apparent from the following description are accomplished in accordance with the invention, generally speaking, by providing highly elastic foils and fibers prepared by the isocyanate polyaddition process, through the reaction in polar solvents of prepolymers comprising NCO groups and formed from substantially linear polyhydroxyl compounds of relatively high molecular weight and polyisocyanates with chain extenders, the solvent being removed with shaping to form foils and fibers. The new process is characterized by the use as polyhydroxyl compounds of compounds of the general formula

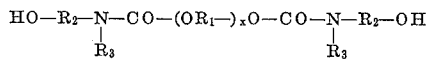

in which $R_1$ represents a divalent aliphatic, cycloaliphatic or araliphatic radical, $R_2$ represents a divalent aliphatic radical, $R_3$ represents a monovalent saturated or unsaturated aliphatic, cycloaliphatic or araliphatic radical and $x$ represents an integer larger than 3.

The products obtained by the process according to the invention have a substantially improved resistance to hydrolysis. Compared with foils and fibers which are based on polyesters, polyester amides and polyacetals, as compared with filaments and foils based on polyethers and polythioethers, they have a greatly improved resistance to light and oxidation. This is shown in a distinctly smaller decrease in the physical properties and also in a smaller degree of yellowing on exposure to light and atmospheric influences, more especially exhaust gases from combustion. Furthermore, an improved tearing strength is frequently shown by comparison with comparable elastomers based on polyethers.

It is surprising that the elastomers with a polyether base, which otherwise show a ready tendency to yellowing under the influence of light and oxygen and also a decrease in the physical properties, provide light resistant shaped elements after introduction of only two N-substituted urethane groups per polyether molecule.

The use of polyurethanes containing N-alkyl-substituted terminal hydroxyl groups obtained from N,N'-dialkyldiamines and bischloroformic acid esters for the reaction with polyisocyanates and chain extenders has been described in U.S. Patent 3,044,990. The resistance to hydrolysis and light of such elastomers produced from polyhydroxyl compounds with practically only N-alkyl-substituted urethane bonds in the chain is indeed good, but the elastic properties, more especially the permanent elongation and the decrease in tension, is greatly impaired by the presence of these groups, so that these materials only have low quality elastomeric properties.

The polyhydroxyl compounds of the formula

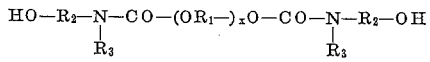

used according to the invention should preferably have melting points below about 70° C., but more especially below about 50° C., and molecular weights from about 500 to about 5000. The preferred molecular weight range is from about 800 to about 2000. They can, for example, be produced from 1 mol of bis-chloro formic acid esters of a polyether HO—(OR$_1$—)OH with 2 mols of amino alcohol HO—R$_2$—NHR$_3$ in aqueous organic medium in the presence of hydrochloric acid acceptors. Examples include bis-chloro formic acid esters of polypropylene glycol, for example, molecular weight 500, polytetramethylene glycol, for example, molecular weight 600, polyhexa-methylene glycol for example molecular weight 600 or mixtures thereof, and also the bis-chloro formic acid esters of mixed polyethers of propylene oxide and tetrahydrofuran or of 1,6-hexane diol, methyl-1,6-hexane diol and bis-hydroxymethyl cyclohexane, which can, for example, be reacted with the following amino alcohols: N-methylethanolamine, N-ethylethanolamine, N-propylethanolamine, isopropyl ethanolamine, N-cyclohexyl ethanolamine, N-benzyl ethanolamine, N-methyl-1,3-propanolamine, N-methyl-1,2-propanolamine and N-alkyl butanolamine.

For use as a polyether for the production of the starting material to be used according to the invention, it is also possible for conventional polyethers which are widely used industrially, which have predominantly secondary hydroxyl groups, e.g. polypropylene glycols, to be transformed into polyhydroxyl compounds with primary hydroxyl groups, to which preference is always given. It is thereby made possible for polyethers which are readily available industrially to be taken as a basis for the production of elastomers which are resistant to hydrolysis.

Small quantities of other conventional polyhydroxyl compounds such as polyesters and polyethers can be of course be used as starting material, jointly with the polyhydroxyl compounds according to the invention. The reaction with an excess of polyisocyanates takes place in a manner known per se in the melt or in solution.

Suitable polyisocyanates are, for example, 1,4-phenylene diisocyanate, 4,4'-diphenyl diisocyanate, 4,4'-diphenyl methane diisocyanate, 4,4'-diphenyl dimethyl methane diisocyanate, dibenzyl diisocyanate and their substitution products, 1,4-cyclohexane diisocyanate, hexamethylene diisocyanate or 4,4'-hexahydrodiphenylmethane diisocyanate. Particularly important are diphenylmethane-4,4'-diisocyanate and the isomeric toluylene diisocyanates such as 80% 2,4- and 20% 2,6-toluylene diisocyanate. Other suitable polyisocyanates are, for example, described in U.S. Patent 2,957,852.

The reaction of these —NCO containing prepolymers with chain extenders takes place in solution. As chain extenders, there are to be considered all compounds which are known for this purpose and which have in the molecule at least two hydrogen atoms reactive with —NCO groups. The following are examples: such glycols as 1,4-butanediol and 1,4-phenylene-bis-oxyethyl ether, such diamines as ethylene diamine, piperazine and 3,3-dichlorobenzidine, such amino alcohols as ethanolamine, such hydrazines as hydrazine hydrate and N,N'-diamino piperazine, such dihydrazides as carbodihydrazide, adipic dihydrazide, resorcinol-bis-propionic hydrazide and cyanuric acid-1-dimethylamido-3,5-dihydrazide, such hydroxy-hydrazides as o-hydroxybutyric hydrazide, such bis-semicarbazides as 1,6-hexamethylene-bis-semicarbazide and such bis-carbazinic acid esters as butylene-1,4-bis-carbazinic acid ester. In addition, compounds such as trimethylolpropane, diethanolamine, diethylene triamine, citric acid trihydrazide, N-tripropionic acid trihydrazide or water can also concurrently be employed. Chain extenders which are particularly suitable are dihydrazides (e.g. carbodihydrazide) or hydrazine. The elastomers produced using them show good solubility and give spinning solutions with a long storage time and no tendency to a pasty solidification, in particular contrast to those elastomer solutions which have been prepared using aliphatic diamines such as ethylene diamine as chain extender.

The reaction with the chain extender in solution is likewise effected in a manner known per se.

In detail, the process according to the invention, for example, can be carried out as follows: 1.0 mol of the polyhydroxyl compound according to the formula is reacted in the melt or in solution, with 1.5 to 3.5 mols of a diisocyanate at about 80 to about 150° C. more especially at about 90 to about 120° C. The —NCO containing prepolymer formed, provided it is not already in solution is dissolved in polar organic solvents, e.g. dimethyl formamide, dimethyl acetamide, N-methyl pyrrolidone or dimethyl sulphoxide; in addition such solvents as methyl ethyl ketone, dioxane, tetrahydrofuran or chlorobenzene can concurrently be used. Thereafter, reaction is carried out with a quantity of a chain extender which is substantially equivalent to the —NCO groups determined by titration. Depending upon the choice of the chain extender, the reaction temperatures are preferably from about —20° C. to about +120° C., more especially from about 0 to about 80° C.

It is often expedient, for example, when using glycols, for the chain extender to be used in less than equivalent quantity, calculated on the —NCO groups present, since a certain quantity of the —NCO groups should be available for branching reactions on the urethane and urea groups. Furthermore, the reactivity of dimethyl formamide with —NCO groups leads to a quantity of —NCO groups which cannot be exactly determined, being withdrawn from the polyaddition reaction at high temperature.

Another method which is known for the production of foils and fibers with simultaneous shaping consists in spinning the —NCO containing prepolymer into a bath containing chain extenders and winding the filaments and foils that are formed.

The shaping from solution can be carried out quite generally by known processes, e.g. by dry or wet spinning or by casting the solutions to form films and evaporating the solvent and cutting the shaped elements e.g. filaments from the foils which are obtained.

One preferred method of shaping is carried out in the dry spinning process. For this purpose, solutions with viscosities of at least 300 poise/20° C. are spun through spinnerets into a shaft heated to about 150° C. to about 250° C. into which air or inert gases at about 150 to about 330° C. are injected, multifilar filaments with low individual counts being obtained by using multi-aperture spinnerets. By suitably carrying out the spinning process, the individual fibers can either be obtained not stuck together, or the individual filaments can be allowed to come into contact at the bottom of the spinning shaft or after leaving the latter, so that an apparently monofilar filament is formed which can be split up by mechanical action more or less easily into its individual filaments.

When carrying out the shaping by a wet spinning process, the viscous solution (0.5 to 1000 poises/20° C.) is spun into hot water or solvent mixtures, e.g. into aqueous solutions containing dimethyl formamide, dimethyl sulphoxide or ethylene glycol. For controlled filament formation, particularly in wet spinning processes, it is frequently advantageous if the spinning solution contains other solvents such as dioxane, chlorobenzene, nitrobenzene, benzyl alcohol and tetrachloroethane as well as polar solvents such as dimethyl formamide. The filaments are freed from solvent by thorough washing, optionally by standing for a relatively long time in hot water.

The mechanical and elastic properties of the elastomer filaments can sometimes be improved by thermal aftertreatment, e.g. heating the fibers at about 90 to about 150° C. or by brief boiling in water. If the filaments have an orientation or a stretching as a result of the spinning process or due to initial elongation, this orientation can be set by a heat treatment on the bobbins (e.g. about 6 hours at about 80° C., 4 hours at about 100° C. or 1 hour at about 130° C.), the mechanical and elastic properties of the filaments being changed. Thus, the elongation at break of the filaments is somewhat reduced, but on the other hand, the modulus of the filaments in dependence on the initial elongation increases considerably. The tendency of pre-orientated filaments to shrink can be reduced or eliminated by heat-setting.

By simultaneously cross-linking of the filaments with polyethylene imide compounds such as hexamethylene-bis-ethylene imide urea while stretching insoluble filaments with more favorable elastic properties, particularly with improved elastic recovery after elongation are obtained in solvents such as dimethyl formamide or solvents such as are used for dry cleaning.

The highly viscous solutions obtained by the process according to the invention can also be spun in accordance with Belgian Patent 586,958, through suitable spinnerets in conjunction with another filament-forming solution, e.g. polyacrylonitrile, into dimethyl formamide to form a two-component filament.

The highly elastic filaments obtained by spinning the elastomer solutions have excellent strength values, high elastic elongations (400 to 900%), relatively high elasticity moduli and good elastic recovery after repeated stretching. Since the filaments are very resistant to abrasion, are stable to oxidation and the action of cosmetic oils, and in addition can be dyed very easily, they can with advantage be used instead of filaments of vulcanized rubber for the manufacture of elastomeric fabrics of various types. Such fabrics are used more especially in the corset industry for the manufacture of elastic tapes, garters, surgical stockings, bathing suits and other articles.

The highly elastic polyurethane fibers can also be processed in admixture (3 to 50%) with conventional textile fibers, it being possible for the elastomer filaments optionally to be in a more highly stretched condition, so that fabrics with high elasticity, good crease recovery power and a low tendency to pilling are obtained. Highly-elastic polyurethane filaments around which are spun textile fibers and endless filaments can also be used with great advantage as an admixture in normal woven and knitted fabrics, so that their crease recovery can be greatly improved.

The invention is further illustrated by the following examples in which parts are by weight unless otherwise specified.

*Example 1*

(a) Production of the starting material

About 1165 parts of a bis-chloroformic acid ester of polytetrahydrofuran (OH number 138) are added dropwise to a strongly-stirred solution of about 184 parts of N-methyl ethanolamine in about 1.5 liters of benzene and about 245 parts of potassium carbonate in about 300 ml. of water at an internal temperature of about 25 to about 30° C. and the mixture is heated for about three hours at about 60° C. After separating the aqueous phase, the benzene solution is washed twice with water and the solvent is distilled off. There remains a yellow, viscous oil, which shows an OH content of about 3.185% after drying for about six hours at about 80° C./0.1 mm. Hg.

(b) Process according to the invention

About 1000 parts of starting material are reacted for about one hour at about 85 to about 90° C. with about 81.5 parts of toluylene-2,4-diisocyanate (molar ratio OH:NCO=2:1) and the reaction product is heated for about one hour at about 98° C. with about 199.5 parts of diphenylmethane-4,4'-diisocyanate (molar ratio

OH:NCO=1:1.7)

in about 550 parts of chlorobenzene, —NCO content of the prepolymer is 1.29%.

About 600 parts of the prepolymer solution are poured in about ten minutes into a solution at about 70° C. of about 8.91 parts of carbodihydrazide in about 1010 parts of dimethyl formamide while stirring vigorously, a viscous elastomer solution (90 poise/20° C.) is formed. The solution is pigmented by about 32 parts of a 33% paste of titanium dioxide (rutile) and dimethyl formamide. By incorporation of about 0.66 part of hexane-1,6-diisocyanate by stirring into the solution at a temperature of about 70° C., the viscosity rises strongly (about 550 poises/20° C.).

(c) Comparison experiment

About 500 parts of polytetramethylene ether glycol (OH number 138) are subjected to a similar reaction sequence with like molar ratios of the reactants as the starting material in (b): reaction for one hour with about 54.4 part of toluylene-2,4-diisocyanate at about 85 to about 90° C., reaction for one hour at about 98° C. with about 133 parts of diphenyl methane-4,4'-diisocyanate in about 295 parts of chlorobenzene, —NCO content of the prepolymer solution after cooling: 1.44%.

About 791 parts of the prepolymer solution are introduced with vigorous stirring and within about 15 minutes into a solution at a temperature of about 70° C. consisting of about 13.30 parts of carbodihydrazide in about 1350 parts of dimethyl formamide and about 43 parts of approximately a 33% titanium dioxide paste (rutile) are added to the solution. The viscosity of the solution after cooling is about 300 poise/20° C. By adding about 0.30 part of hexane-1,6-diisocyanate, the viscosity of the solution rises to about 520 poises/20° C.

(d) Shaping and measurement results

The solutions (b) and (c) are spun into elastic filaments under the same conditions by the dry spinning process. For this purpose, the solution heated to about 40° C. is spun through a spinneret having about 16 holes with a diameter of about 0.2 mm. into a spinning shaft about 5 meters long, is heated to about 210° C. Air at a temperature of about 280 to about 300° C. is blown over the filaments which are drawn off with a roller system at about 80 m./min. and after preparation with an aqueous suspension of talc, are wound onto bobbins, optionally with stretching (0, 50, 100%). The filaments are finally heated on the bobbins for about 1 hour at about 130° C. The properties of the filaments made from solutions (b) and (c) are indicated by way of comparison in the following Table 1.

TABLE 1

| | (b) | (c) (Comparison experiment) |
|---|---|---|
| Stretching, percent | 0 / 50 / 100 | 0 / 50 / 100 |
| Tensile strength (g./den.) | 0.85 / 0.92 / 1.02 | 0.75 / 0.83 / 0.86 |
| Elongation at break, percent | 700 / 625 / 550 | 700 / 600 / 480 |
| Tensile strength, related to rupture count (g./den.) | 6.8 / 6.7 / 6.6 | 6.0 / 5.75 / 5.0 |
| Modulus 300% (first cycle) mg./den | 100 / 115 / 170 | 90 / 125 / 190 |
| Modulus 150% (third cycle) mg./den | 17 / 23 / 20 | 19 / 24 / 25 |
| Elastic recovery, percent | 25 / 88 / 85 / 85 | 25 / 86 / 85 / 84 |

If the filaments, with a withdrawal speed of about 400 m./min. from the shaft are wound after being coated with talc directly onto bobbins and heated for about one hour at about 130° C. on the latter, practically the same properties are obtained as with 100% stretching.

Foils with a thickness of about 0.15 to 0.20 mm. are produced from the solutions and exposed to light in the form of strips about 1 cm. wide in an Atlas Fade-O-meter. There is a distinctly reduced discoloration of the foils consisting of the starting material according to the invention (Table 2).

TABLE 2

| | Hours | | | | | |
|---|---|---|---|---|---|---|
| | 0 | 10 | 20 | 30 | 50 | 110 |
| Foils of (b) | Colorless | Colorless | Colorless | Almost colorless | Slightly yellowish | Brownish yellow |
| Foils of (c) Comparison Experiment | do | Slightly yellowish | Yellowish | Yellow | Yellow | Yellow |

More stable products are also obtained adding light stabilizers such as 1,1-dialkyl semi-carbazides, 1,1-dialkyl carbazinic esters, N,N-dialkyl carboxylic acid hydrazides and the like such as

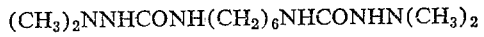

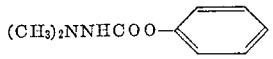

adipic acid-di-(N,N-dimethyl hydrazide) and the like.

Filaments of rectangular cross-section are cut from the foils and their strength properties are investigated before and after exposure to light in the Fade-Ometer (Table 3).

TABLE 3

|  | Light exposure in hours | Tensile strength, g./den. | Elongation at break, percent | Tensile strength related to rupture count, g./den. |
|---|---|---|---|---|
| Filaments of (b) | 0 | 0.72 | 746 | 6.10 |
|  | 10 | 0.78 | 705 | 6.24 |
|  | 40 | 0.28 | 565 | 1.80 |
|  | 60 | 0.16 | 435 | 0.62 |
| Filaments of (c) Comparison test | 0 | 0.67 | 745 | 5.80 |
|  | 10 | 0.66 | 685 | 5.10 |
|  | 40 | 0.07 | 280 | 0.25 |
|  | 60 | 0.05 | 210 | 0.14 |

Measuring processes

The measurement of the elastomeric properties of filaments or films is carried out with the Elasto-tensograph described in Chimia, 16, 93 to 105 (1962). In this case, there is determined the tension value with 300% elongation ($M_{300}$) in the first stretching of the filament with a stretching speed of about 400%/min. and also the tension value with 150% elongation in the third relaxing cycle ($M_{150}$) after having been stretched three times to 300% with a speed of about 400%/min. and also the elastic recovery of three elongation-relaxation cycles (300% elongation, 400%/min. elongation speed), about 30 seconds after relaxation of the filament.

Example 2

(a) Production of the starting material

About 345 parts of potassium carbonate in about 500 ml. of water are added to about 300 parts of N-methyl ethanolamine in about 2.0 liters of benzene and about 2250 parts of bis-chloroformic acid ester of polypropylene glycol (molecular weight about 1000) are added dropwise at about 25 to about 30° C. After heating for about two hours at about 60° C. the organic phase is separated, washed with water until free from salt and freed from the solvent. Yield about 96 to 97% of a light yellow oil of low viscosity (OH number 93).

(b) Reaction according to the invention

About 100 parts of starting material are dehydrated for about 60 minutes in vacuo at about 130° C. The dry polyhydroxyl compound is reacted with about 7.3 parts of 2,4-toluylene diisocyanate for about 60 minutes at about 100° C. and the reaction product is reacted with about 21.0 parts of diphenylmethane-4,4'-diisocyanate for about 60 minutes at about 100° C. to form the —NCO prepolymer and thereafter dissolved in about 100 parts of dioxane (—NCO content about 1.55%). About 150 parts of prepolymer solution are poured in about 3 to 5 minutes into a solution at about 70° C. of about 2.60 parts of carbodihydrazide in about 170 parts of dimethyl formamide while stirring vigorously, a viscous solution being formed.

(c) Comparison test

About 100 parts of a linear polypropylene ether glycol (molecular weight about 1000) are reacted as under (b) with about 8.75 parts of 2,4-toluylene diisocyanate and about 22.0 parts of diphenylmethane-4,4'-diisocyanate to form the —NCO prepolymer which is dissolved in about 120 parts of dioxane (NCO content about 1.14%).

About 150 parts of —NCO prepolymer solution are rapidly poured into a hot solution of about 1.85 parts of carbodihydrazide in about 170 parts of dimethyl formamide while stirring well, a viscous solution being formed.

Foils with a thickness of about 0.15 to 0.20 mm. are produced from each solution (b) and (c). These foils have the following properties:

TABLE 6

|  | Foil of (b) | Foil of (c) Comparison test |
|---|---|---|
| Tensile strength (kg./cm.²) | 260 | 90 |
| Elongation at break (percent) | 680 | 770 |
| Tensile strength related to rupture cross-section (kg./cm.²) | 2,030 | 780 |
| Elasticity 20% (kg./cm.²), 300% (kg./cm.²)[1] | 107 | 56 |
| Resistance to further tearing according to Graves (kg./cm.) | 35 | 17 |
| Microhardness | 55 | 49 |
| Light exposure 50 hours Fade-Ometer | (²) | (³) |

[1] With the first stretching.
[2] Light yellow.
[3] Brown.

Example 3

(a) Production of the starting material

About 1655 parts of bis-chloroformic acid ester of polytetrahydrofuran (molecular weight about 1580) are added dropwise at about 25 to about 30° C. and while stirring vigorously to a solution of about 159 parts of N-methyl ethanolamine in about 2.0 liters of benzene and about 290 parts of potassium carbonate in about 350 ml. of water and the mixture is heated for about three hours at about 60° C. After separating the aqueous phase, the benzene solution is washed with water and the solvent is distilled off. A viscous oil is left, and after drying for about six hours at about 80° C. this has an —OH number of about 2.03%.

(b) Reaction according to the invention

About 600 parts of starting material are heated with about 144 parts of diphenylmethane-4,4'-diisocyanate and about 186 parts of chlorobenzene for about two hours at about 98° C. and after cooling have an —NCO content of about 1.71%. About 30 parts of solid carbon dioxide are introduced while stirring vigorously into a freshly prepared solution of about 4.55 parts of about 96.4% hydrazine hydrate in about 824 parts of dimethyl formamide. The suspension of hydrazine-carboxylic acid is treated with about 403 parts of the —NCO prepolymer solution with high-speed stirring of the solution and within about 10 minutes. By adding about 24.5 parts of about a 33% paste of titanium dioxide in dimethyl formamide, the solution is pigmented and highly elastic foils with a thickness of about 0.2 mm. are produced by pouring the solution onto glass plates and evaporating the solvent. The foils show the following properties:

Tensile strength _____kg./cm.² __ 440
Elongation _____pct__ 760
Elasticity at 300% elongation _____kg./cm.² __ 112
Resistance to tearing according to
 Graves _____kg./cm__ 42

Example 4

(a) Production of the starting material

About 1925 parts of bis-chloroformic acid ester of a polyether of about 15% propylene oxide and about 85% tetrahydrofuran and with a molecular weight of about 1610 are added dropwise at about 30° C. with vigorous stirring to a solution of about 181 parts of N-methyl ethanolamine in about 2.0 liters of benzene and about 250 parts of potassium carbonate in about 300 ml. of water and heated for about three hours at about 60° C. After separating the aqueous phase and washing with water, the organic phase is freed from the solvent and the remaining oil is dried in vacuo at about 80° C. (—OH number about 67).

(b) Reaction according to the invention

About 600 parts of starting material are heated with about 151.5 parts of diphenylmethane-4,4′-diisocyanate and about 188 parts of chlorobenzene for about 4 hours at about 96 to 98° C. and after cooling, have an —NCO content of about 1.98%.

About 360 parts of the —NCO prepolymer are incorporated while stirring at high speed into a solution at a temperature of about 70° C. consisting of about 7.75 parts of carbohydrazide in about 726 parts of dimethyl formamide, the pigment content is brought to about 4% (related to the solid content of the solution) by adding titanium dioxide. After casting the solution and evaporating the solvent, foils about 0.2 mm. thick are obtained and have the following properties:

| | |
|---|---|
| Tensile strength | kg./cm.² __ 472 |
| Elongation | pct__ 790 |
| Elasticity at 300% elongation | kg./cm.² __ 92 |
| Tearing strength according to Graves | kg./cm__ 34 |

Example 5

(a) Production of the starting material

About 562 parts of bis-chloroformic acid ester of a mixed polyether of 1,6-hexanediol and beta, gamma-methyl-1,6-hexanediol (molar ratio about 9:1, molecular weight about 1200) dissolved in about 500 ml. of benzene are added at about 25 to about 30° C. to about 121 parts of N-cyclohexyl ethanolamine in about 750 ml. of benzene to which about 88 parts of potassium carbonate in about 120 ml. of water have already been added. After heating for about 3 hours at about 65° C., the organic phase is separated, washed free from salt with water and freed from the solvent. Yield about 95%, light yellow semi-solid mass (—OH number about 72).

(b) Reaction according to the invention

About 0.2 ml. of about a 30% sulphur dioxide solution in dioxane are added to about 100 parts of starting material and the mixture is dehydrated for about 60 minutes in vacuo at about 130° C. The dried polyhydroxyl compound is reacted with about 5.6 parts of 2,4-toluylene diisocyanate for about 50 minutes at about 100° C. and the reaction product is heated with about 16.2 parts of diphenylmethane-4,4′-diisocyanate for about 50 minutes at about 100° C. to form the —NCO prepolymer which is dissolved in about 100 parts of dioxane (—NCO content about 1.02%).

About 150 parts of prepolymer solution are poured at about 70° C. into a solution of about 1.68 parts of carbohydrazide in about 170 parts of dimethyl formamide while stirring vigorously. The viscosity of the resulting solution is further increased by adding about 0.4 part of hexane-1,6-diisocyanate in about 10 parts of dioxane.

(c) Comparison test

About 100 parts of a mixed polyether of hexane-1,6-diol and beta,gamma-methylhexane-1,6-diol (molar ratio about 9:1, molecular weight about 1200) are reacted as under (b) with about 7.25 parts of 2,4-toluylene diisocyanate and about 20.8 parts of diphenylmethane-4,4′-diisocyanate to form the —NCO prepolymer, which is dissolved in about 100 parts of dioxane (—NCO content about 1.30%). About 150 parts of the prepolymer solution are poured while stirring well at about 70° C. into a solution of about 2.20 parts of carbodihydrazide in about 200 parts of dimethyl formamide. A viscous solution results and, by adding about 0.4 part of hexane-1,6-diisocyanate in about 10 parts of dioxane, the viscosity of the solution is further increased.

Foils with a thickness of about 0.15 to 0.20 mm. are produced from the solutions (b) and (c), and exposed to light for about 50 hours in an Atlas Fade-Ometer. The foil (b) becomes slightly yellow in color, but the foil (c) becomes dark brown.

It is to be understood that the foregoing working examples are given for the purpose of illustration and that any other suitable prepolymer, organic isocyanate, polyhydroxyl compounds in accordance with the foregoing general formulas, solvents or the like could be used therein provided that the teachings of this disclosure are followed.

Although the invention has been described in considerable detail for the purpose of illustration, it is to be understood that variations can be made by those skilled in the art without departing from the spirit of the invention and scope of the claims.

What is claimed is:

1. Polyurethane foils and fibers prepared by a process which comprises reacting a compound having the formula

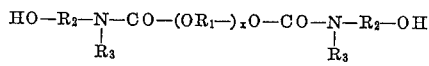

wherein $R_1$ and $R_2$ are low molecular weight divalent saturated aliphatic radicals containing only carbon and hydrogen, $R_3$ is a low molecular weight monovalent saturated aliphatic radical containing only carbon and hydrogen and $x$ is an integer greater than 3 sufficient to give the compound a molecular weight of from about 500 to about 5000, with an organic diisocyanate in a first step in solution at an OH to NCO ratio sufficient to yield an hydroxyl terminated prepolymer, reacting the resulting hydroxyl terminated prepolymer in a second step with a different organic diisocyanate to prepare an NCO terminated prepolymer and reacting said NCO terminated prepolymer in a third step with a chain extending agent to prepare a solution of an elastomeric polyurethane which is subsequently shaped while removing the solvent to form foils and fibers.

2. The polyurethane foils and fibers of claim 1 wherein the isocyanate employed in the first step is toluylene diisocyanate, the isocyanate employed in the second step is diphenylmethane diisocyanate and the chain extending agent is carbodihydrazide.

3. The polyurethane foils and fibers of claim 1 wherein said solvent is a polar solvent.

4. The polyurethane foils and fibers of claim 2 wherein said solvent is dimethyl formamide.

5. A polyurethane thread prepared by a process which comprises reacting a compound having the formula

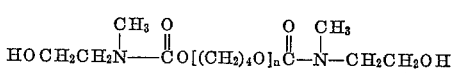

wherein $n$ is an integer sufficient to give the compound a molecular weight of from about 800 to about 2000 with toluylene diisocyanate to prepare a prepolymer having free hydroxyl groups, reacting said prepolymer in a second step with diphenylmethane diisocyanate in such proportions to prepare a product having free —NCO groups and reacting the resulting —NCO terminated prepolymer in dimethyl formamide as a solvent with carbodihydrazide to prepare a solution of a polyurethane elastomer which is subsequently spun into a polyurethane thread with removal of the solvent.

6. The polyurethane foils and fibers of claim 1 wherein $R_2$ has from 2 to 4 carbon atoms.

7. The polyurethane foils and fibers of claim 1 wherein $R_3$ has from 1 to 7 carbon atoms.

8. The polyurethane foils and fibers of claim 1 wherein $R_3$ is alkyl having from 1 to 3 carbon atoms.

References Cited

UNITED STATES PATENTS

| 2,929,800 | 3/1960 | Hill | 260—32.6 |
| 3,074,911 | 1/1963 | Harper | 260—32.6 |
| 3,232,908 | 2/1966 | Oertel et al. | 260—32.6 |

JULIUS FROME, *Primary Examiner.*

B. A. AMERNICK, *Assistant Examiner.*